United States Patent
Dore et al.

(10) Patent No.: US 12,552,663 B2
(45) Date of Patent: Feb. 17, 2026

(54) MEMS PACKAGING ENABLING VERTICAL DISPLACEMENT OF SENSOR AND ACTUATOR ROTOR

(71) Applicant: Connaught Electronics Ltd., Tuam (IE)

(72) Inventors: Maurice Dore, Tuam (IE); Gerard Conway, Tuam (IE); Terrance Mcdonald, Troy, MI (US); Enda Ward, Tuam (IE); Margaret Glavin, Tuam (IE)

(73) Assignee: Connaught Electronics Ltd., Tuam (IE)

( * ) Notice: Subject to any disclaimer, the term of this patent is extended or adjusted under 35 U.S.C. 154(b) by 94 days.

(21) Appl. No.: 18/383,223

(22) Filed: Oct. 24, 2023

(65) Prior Publication Data

US 2025/0128936 A1 Apr. 24, 2025

(51) Int. Cl.
*B81B 7/00* (2006.01)

(52) U.S. Cl.
CPC ...... *B81B 7/007* (2013.01); *B81B 2201/0292* (2013.01); *B81B 2207/07* (2013.01); *B81B 2207/094* (2013.01)

(58) Field of Classification Search
CPC ... B81B 7/0067; B81B 7/007; B81B 2207/07; B81B 2207/091; B81B 2201/0292; B81B 2207/094; B81B 2201/038; B81B 2203/053; B81B 2207/096; H04N 23/54; H04N 23/687

See application file for complete search history.

(56) References Cited

U.S. PATENT DOCUMENTS

| | | | |
|---|---|---|---|
| 6,528,875 B1 | 3/2003 | Glenn et al. | |
| 8,988,586 B2 | 3/2015 | McKinley | |
| 9,306,475 B1 | 4/2016 | Faez et al. | |
| 10,807,857 B2 | 10/2020 | Liu et al. | |
| 10,893,200 B2 | 1/2021 | Ba-Tis et al. | |
| 10,965,848 B1 | 3/2021 | Ba-Tis | |

(Continued)

FOREIGN PATENT DOCUMENTS

| | | |
|---|---|---|
| CN | 209250741 U | 8/2019 |
| CN | 215512709 U | 1/2022 |
| WO | 2021249191 A1 | 12/2021 |

OTHER PUBLICATIONS

Written Opinion and International Search Report for PCT/US2024/052590, Dated Feb. 25, 2025, All together 12 Pages.

*Primary Examiner* — Moazzam Hossain
(74) *Attorney, Agent, or Firm* — Connaught Electronics Ltd.

(57) ABSTRACT

A MEMS device includes an electrical distribution substrate and a spacer ring extending upward therefrom. An actuator stator is positioned above the electrical distribution substrate and within the spacer ring. An outer frame extends from a floor of the actuator stator. An actuator rotor is suspended above the floor. A sensor is supported by the actuator rotor. A conductive stack is positioned above the spacer ring. A wire electrically connects the sensor to the conductive stack. A plurality of vias extending through the spacer ring and to the electrical distribution substrate, thereby allowing electrical communication between the sensor and the electrical distribution substrate while enabling vertical displacement of the sensor and actuator rotor.

20 Claims, 3 Drawing Sheets

(56) References Cited

U.S. PATENT DOCUMENTS

| | | | |
|---|---|---|---|
| 12,145,839 B1* | 11/2024 | Ba-Tis | ................. B81B 7/0058 |
| 2016/0245667 A1 | 8/2016 | Najafi et al. | |
| 2018/0086628 A1* | 3/2018 | Vossough | ............ G01L 19/0007 |
| 2018/0213312 A1 | 7/2018 | Hsuai et al. | |
| 2019/0241426 A1* | 8/2019 | Sun | ........................ H01L 24/73 |
| 2020/0385264 A1* | 12/2020 | Brockmeier | .......... G01S 7/4817 |
| 2021/0354979 A1* | 11/2021 | Ba-Tis | ................. H04N 23/687 |
| 2022/0030148 A1 | 1/2022 | Gruhlke et al. | |
| 2023/0031882 A1 | 2/2023 | Yoshimura et al. | |

\* cited by examiner

MEMS PACKAGING ENABLING VERTICAL DISPLACEMENT OF SENSOR AND ACTUATOR ROTOR

TECHNICAL FIELD

The present disclosure relates to a microelectromechanical system (MEMS) device and associated MEMS packaging that enables free vertical movement of a sensor and actuator rotor therein.

BACKGROUND

MEMS devices are generally known as microscopic devices incorporating both electronic and moving parts. They typically include one or more components (e.g., sensor) that interact with the surrounding environment. Various environmental factors such as temperature changes and vibrations can impact the performance of the sensor.

SUMMARY

In one embodiment, a MEMS device comprises an electrical distribution substrate, a spacer ring extending upward from the electrical distribution substrate, and an actuator stator positioned above the electrical distribution substrate and within the spacer ring. The actuator stator has a floor and an outer frame extending upward from the floor. The MEMS device also comprises an actuator rotor suspended above the floor of the actuator stator and within the outer frame, a sensor supported by and above the actuator rotor, a conductive stack positioned above the spacer ring, a wire bond pad disposed on the conductive stack, and a wire bond interconnect electrically coupling the sensor to the wire bond pad. The spacer ring includes a via extending therethrough which electrically connects the conductive stack to the electrical distribution substrate, enabling an electrical connection between the sensor and the electrical distribution substrate by way of the conductive stack and the via.

In another embodiment, a MEMS device comprises an electrical distribution substrate, and an actuator stator supported to and above the electrical distribution substrate, wherein the actuator stator having a floor and an outer frame extending upward from the floor. The MEMS device also comprises an actuator rotor suspended above the floor of the actuator stator and within the outer frame, lower ring located radially outward from the outer frame of the actuator stator and extending upward from the electrical distribution substrate, an upper ring vertically aligned with the lower ring, a sensor connected to the rotor such that the sensor and the rotor can move vertically relative to the stator, a wire bond interconnect electrically connecting the sensor to the upper ring, and a via extending through the lower ring and to the electrical distribution substrate. An electrical connection is provided between the sensor and the electrical distribution substrate due to an electrical pathway defined by the wire bond interconnect, the upper ring, and the via.

In another embodiment, a MEMS device comprises a Redistribution Layer (RDL) substrate, and a spacer ring extending vertically from the RDL substrate and having a plurality of vias extending therethrough and in electrical communication with the RDL substrate. The MEMS device also comprises a stack including copper and laminate and forming a ring, the stack electrically coupled to the RDL substrate by way of the vias. The MEMS device also comprises a MEMS actuator having a stator mounted to the RDL substrate and within the spacer ring, wherein the MEMS actuator further has a rotor suspended above the stator and configured to translate vertically relative to the stator. The MEMS device further comprises a sensor supported above the rotor and configured to translate vertically along with the rotor, and a wire electrically connecting the sensor to the stack.

DETAILED DESCRIPTION

Figure 1A:
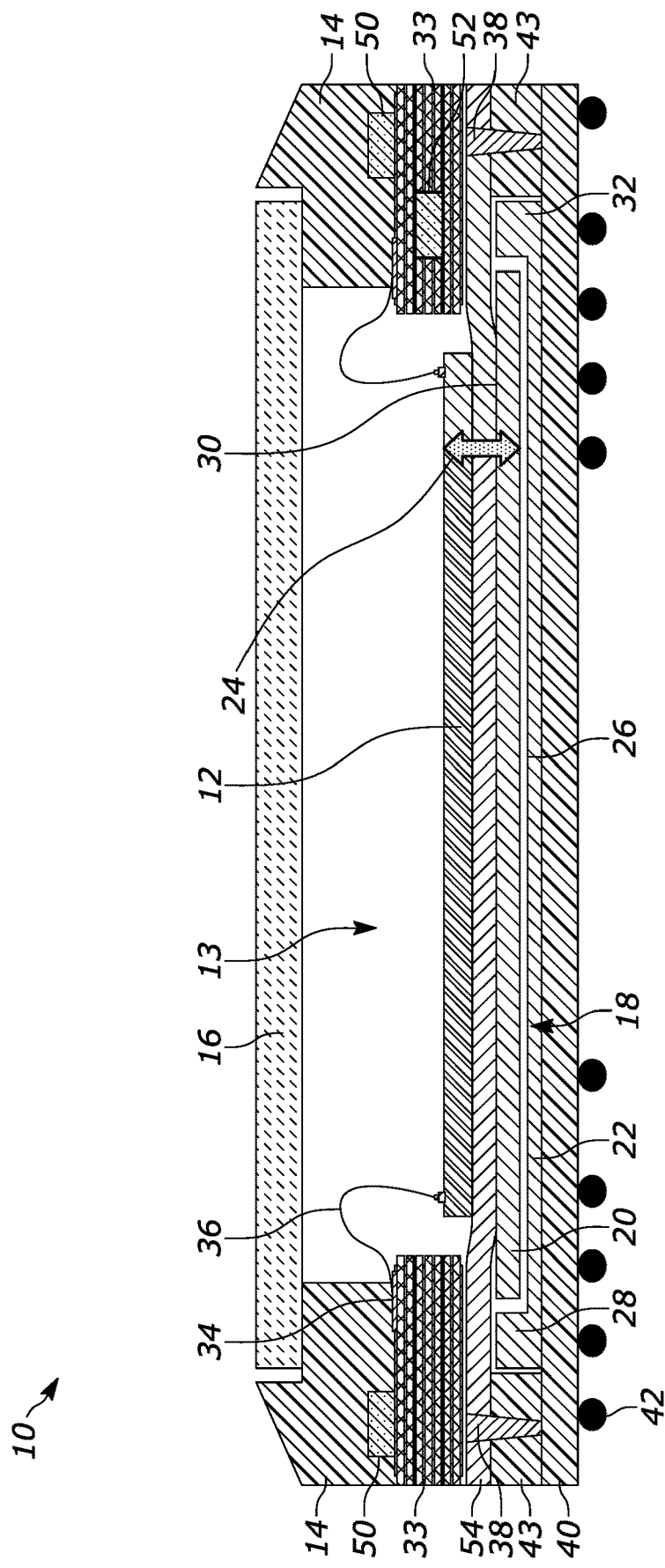
FIG. 1A is a cross-sectional view of a MEMS device and an associated MEMS package according to one embodiment of the present disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the FIGURES can be combined with features illustrated in one or more other FIGURES to produce embodiments that are not explicitly illustrated or described. The combinations of features illustrated provide representative embodiments for typical applications. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

The present disclosure fully incorporates by reference herein the following patent application in its entirety: U.S. patent application Ser. No. 18/210,679 filed Jun. 16, 2023, titled MEMS PACKAGING WITH ACTUATOR STATOR PROVIDING ELECTRICAL CONNECTION POINT.

MEMS devices are generally known to incorporate both electronic and moving parts. They typically include one or more components (e.g., sensor) that interact with the surrounding environment. Various environmental factors such as temperature changes and vibration can impact the performance of the sensor.

Certain prior art systems include a MEMS device with an image sensor (e.g., camera) mounted on a MEMS actuator that can move the image sensor focal plane along the optical axis in order to adjust the focal position. The image sensor is located either below or above the circuit board, and is wire bonded to the circuit board. The image sensor can be wire-bonded to the printed circuit board assembly (PCBA). The wire bonds allow for movement of the sensor relative to the PCBA while maintaining an electrical connection between the image sensor and the PCBA. However, in systems such as these, relatively long wire-bonds can be susceptible to movement and shorting when the MEMS device is utilized in environments with harsh movements, such as automobiles. Moreover, especially in the case where the image sensor is located below the circuit board, this approach consumes both top and bottom circuit-board area. The wire-bond profile is higher than typical solutions to relieve stress on the bond, but can increase the risk of bond-to-bond shorting during operation and manufacturing. This makes miniaturization difficult.

Therefore, according to embodiments disclosed herein, a MEMS device is packaged in such a way that takes advantage of the stator for electrical connection with the circuit board (or other electrical distribution layer or substrate). In embodiments, an actuator has a rotor and a stator and is provided in the MEMS device to move a MEMS-mounted sensor; the MEMS-mounted sensor is mounted on the rotor and is electrically connected to the stator by way of wire bond interconnects. This allows for greater miniaturization of the MEMS device and its packaging, while enabling free movement of the sensor and actuator.

The packaged MEMS device disclosed herein allows for the combined sensor and actuator to be mounted and move freely within the package housing.

An open cavity of the MEMS device can be filled with gas, such as nitrogen (e.g., N2), inert gas or air. Alternatively, the open cavity can be filled with liquid to match the refractive index or the cover (e.g., glass cover) to increase thermal conductivity and shock absorption.

In embodiments, the MEMS device utilizes a System-in-Package technique to build a laminate or a copper pillar and epoxy structure about the MEMS actuator. The open cavity space allows for the sensor and attached rotor to move during operation.

Figure 1B:
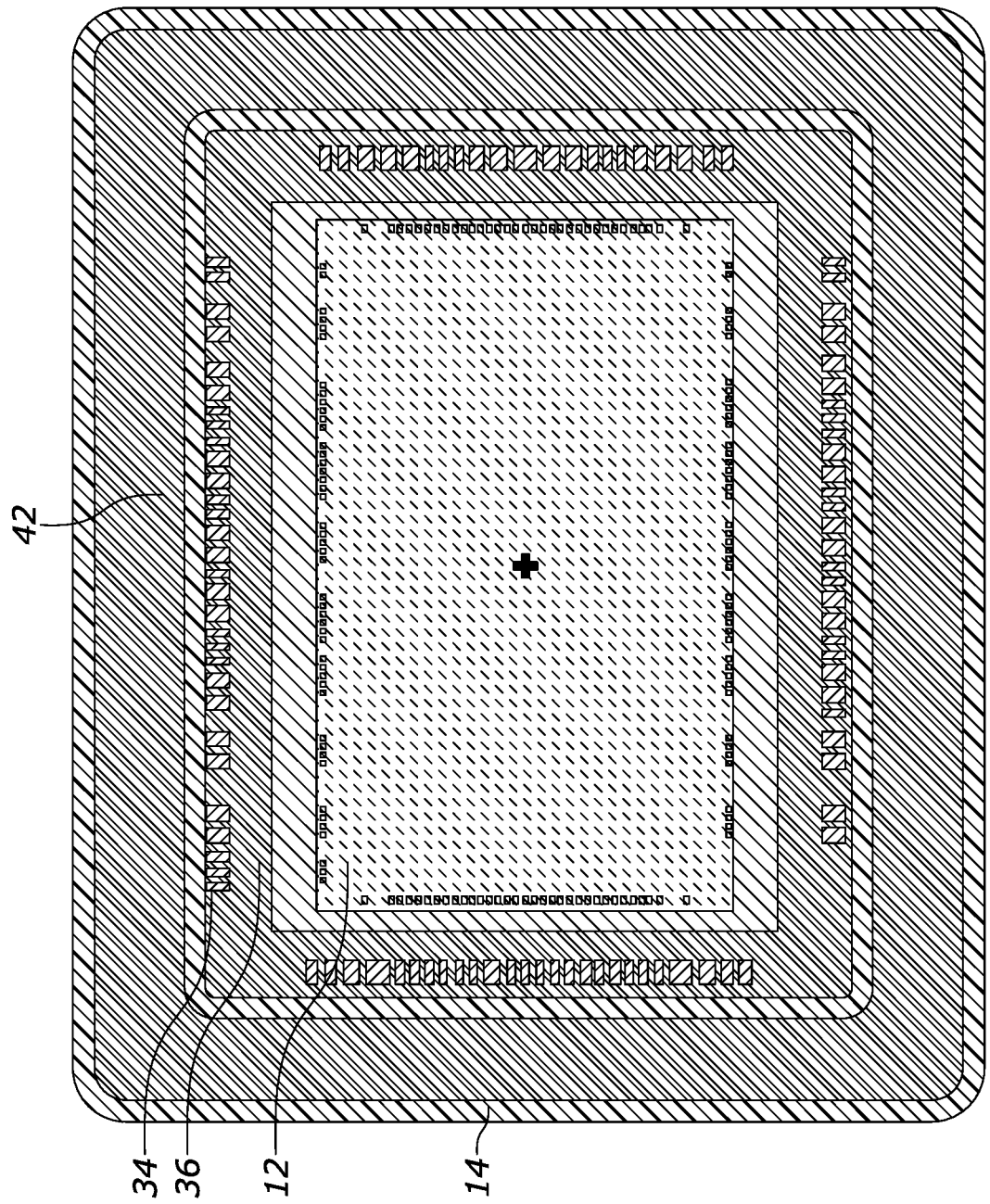
FIG. 1B is a top plan view of the MEMS device and associated MEMS package of FIG. 1A with a cover removed for clarity of underlying components, according to an embodiment.
Figure 1C:
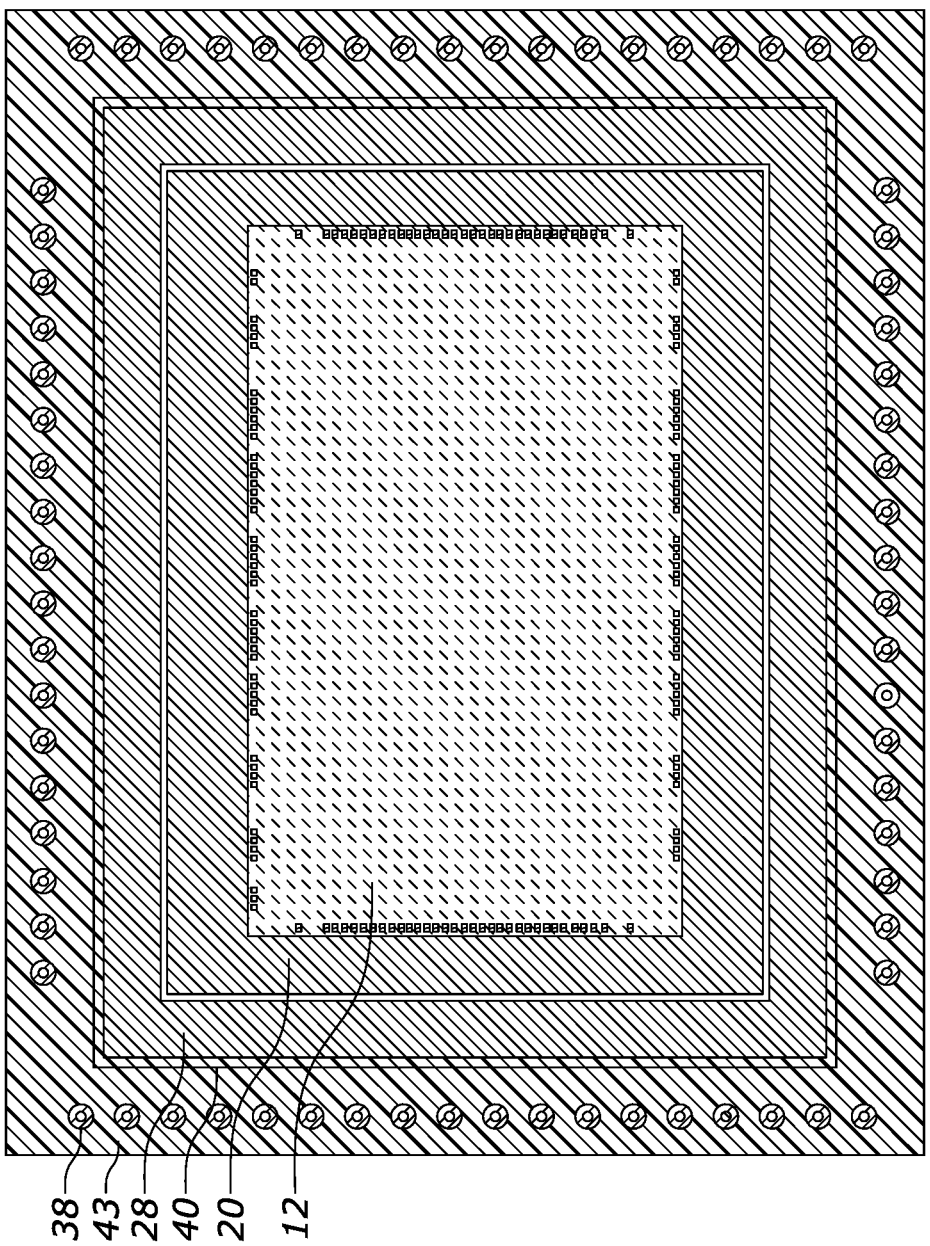
FIG. 1C is a plan view of the MEMS device and associated MEMS package of FIG. 1A with additional components removed to illustrate the MEMS actuator and RDL layer with frame and through vias, according to an embodiment.

FIG. 1A illustrates a cross-sectional view of a MEMS device 10 according to one embodiment of the present disclosure. For additional illustration, FIG. 1B illustrates a top view of the MEMS device 10 with the cover removed for clarity of underlying components, and FIG. 1C illustrates another top view of the MEMS device 10 with additional components removed (e.g., stacked laminate columns, solder ball array, heat spreader layer) to illustrate the MEMS actuator and Redistribution Layer (RDL) with frame and through vias, according to an embodiment. References to the MEMS "device" are intended to refer to a packaged device containing a MEMS-mounted sensor (also referred to herein more generally as a sensor), the circuitry to which it electrically communicates to, and the package itself. As such, the MEMS device 10 can also be referred to as a MEMS system, or microsystem.

The MEMS device 10 includes a sensor 12 housed within a package 14, also referred to as a MEMS package or encapsulation. The sensor 12 may be a single sensor or a sensor array. The sensor 12 may be an image sensor such as a camera, lidar sensor, radar sensor, or the like and may include an array (e.g., a one- or two-dimensional array) of sensor cells (or pixels) for sensing optical signals. For example, the sensor 12 can include a photosensor, such as a photodiode that can generate an electrical voltage or current signal corresponding to the intensity of the optical signal illuminating the pixel. For example, each pixel may convert the optical signal incident on the pixel to an electrical current or integrate the current using a capacitor to generate a voltage signal. The current or voltage signal may be converted to digital pixel data by an analog-to-digital converter. Therefore, each pixel may generate digital pixel data representing an intensity of light received by the pixel. The pixel data from the pixels in sensor array may represent an image of an object or a scene. In particular embodiments, the sensor 12 includes a Charged Coupled Device (CCD) image sensor that include arrays of photosensors and metal-oxide-semiconductor (MOS) capacitors, or a Complementary Metal-Oxide Semiconductor (CMOS) or Active-Pixel Sensor (APS) image sensor that includes arrays of photodiodes and MOS field-effect transistor (MOSFET) amplifiers.

While the sensor 12 is described above as being an image sensor, the present disclosure is not limited to such an embodiment. For example, the sensor may be or include a temperature sensor, pressure sensor, gyroscope, accelerometer, or other such sensor typically found in MEMS devices. Unless otherwise stated, the sensor of the present disclosure is not limited to a particular type of sensor.

The MEMS device 10 may also include a processor (e.g., microprocessor) bonded to or integrated into the sensor 12, configured to at least partially process the data received from the sensor 12 (e.g., pixel data in the embodiment described above). In other embodiments, the processing of the sensor data takes place outside of the package 14.

The package 14 at least partially encapsulates the sensor 12. The package 14 may be made of a polymer material or another dielectric material to provide physical protection and insulation to the sensor 12. The package 14 may include a cover 16 made of glass or other optically-transparent material that protects the sensor 12 from above. The cover 16 protects the sensor 12 from particles, moisture, and the like. This cover 16 is removed in FIGS. 1B-1C for clarity of other components illustrated. In some implementations, for example when the sensor 12 is an image sensor, the sensor 12 may further include one or more optical filters (e.g., a Bayer filter array, not shown) to filter or modify the light (e.g., the intensity, phase, wavelength, or polarization of the light) received by each element (also referred to as a pixel or a cell) of the sensor 12. In some embodiments, the cover 16 may be one of these one or more optical filters. In embodiments in which the sensor 12 is an image sensor, the cover 16 can include or integrate a lens, wherein the image sensor is configured to detect light that is collected and focused by the lens.

The MEMS device 10 also includes a MEMS actuator 18, which includes a rotor 20 (also referred to as a MEMS rotor, MEMS actuator rotor, or actuator rotor), and a stator 22 (also referred to as a MEMS stator, MEMS actuator stator, or actuator stator). The rotor 20 is a moving part of the actuator 18, and the stator 22 is a stationary part of the actuator 18. The MEMS actuator 18 also includes mechanical springs (not shown in this view) that connect the rotor 20 to the stator 22, suspending the rotor 20. In embodiments, the sensor 12 is attached to the rotor 20 using die bond techniques via a glue or an adhesive. The MEMS actuator 18 and attached sensor 12 can move relative to the stator 22. In embodiments, when a voltage is applied across the rotor 20 and the stator 22, an electrostatic force develops between adjacent piston and tube electrodes in the vertical direction. This electrostatic force moves the rotor 20 from its static position towards the stator 22 in a pure translation (piston-style, such as disclosed in U.S. Pat. No. 9,306,475 which is incorporated by reference herein in its entirety) motion along the vertical axis (e.g., up and down in the orientation shown in FIG. 1A, as indicated by arrow 24). When the voltage drops, the rotor 20 moves back to its equilibrium position due to the restoring force in the supporting springs that connect the rotor 20 to the stator 22. In the event the sensor 12 is an image sensor, this movement allows focus adjustments in order to compensate for the thermal effects on the focus of the lens of the image sensor, for example.

In one embodiment, the rotor 20 is partially surrounded by the stator 22. For example, as shown in FIG. 1A, the stator 22 includes a floor 26 and an outer frame 28 (or posts or extensions) extending upward from the floor 26. The rotor 20 is located within the outer frame 28, with an upper surface 30 of the rotor 20 being vertically beneath an upper surface 32 of the outer frame 28. This helps reduce the overall vertical footprint of the MEMS device 10 while still providing an adequate structure for electrical connection by way of the stator 22, as described further below.

In an embodiment, a conductive stack 33 (also referred to as a laminate stack, upper ring, or upper annular ring) is provided radially outward of the sensor 12. The conductive stack 33 can include layers of different materials, such as copper and laminate, stacked in alternating fashion. In another embodiment, the conductive stack 33 is a single, solid material. The conductive stack 33 is disposed vertically above the MEMS actuator 18 such that it provides sufficient vertical spacing to allow for free movement of the MEMS rotor 20. The conductive stack 33 can also form a ring about the sensor 12 to provide various connection points for the various wire bonds, which are described further below. In an embodiment, the stack 33 connects to the flexible thermal spreader layer 54 (described below) via solder balls (not shown), creating a System in Package configuration. In another embodiment, such a connection is made via copper pillar bonding.

A series of wire bond pads 34 are fabricated on the top surface of the conductive stack 33. A dielectric insulation layer (not shown) can be provided between the wire bond pads 34 and the metallization layer (or top surface) of the wire bond pads 34. The sensor 12 is wire bonded to the wire bond pads 34 via wire bond interconnects 36. This provides electrical communication between the sensor 12 and the stack 33. Underneath the stack is an electrical distribution substrate 40, such as a silicon substrate or electrical connection layer on silicon. In one embodiment, the electrical distribution substrate 40 is an RDL attached to a silicon substrate or integrated circuit via solder balls 42. RDL is a conductive (e.g., metal) layer such as metal interconnects that redistribute the Input/Output (I/O) access to different parts of the substrate. This allows for better electrical access to the pads where necessary. In another embodiment, the electrical distribution layer is an area array substrate such as a Ball Grid Array (BGA) substrate, having solder balls 42 on the bottom surface thereof to make connections to the circuit board. Because various substrates exist for chip boards and the like, this component can more generally be referred to as a substrate. In yet other embodiments, the electrical distribution layer is a Land Grid Array (LGA). The electrical distribution substrate 40 can be integrally mounted to the stator 22.

The electrical distribution substrate 40 also includes a spacer ring 43. The spacer ring 43 can also be referred to as a lower ring or lower annular ring as it is aligned with the upper ring 33. Similar to the outer frame 28 of the stator 22, the spacer ring 43 extends upward from the electrical distribution substrate 40. The spacer ring 43 is radially spaced from the outer frame 28 and also does not impede movement of the MEMS rotor 20. In an embodiment, the thickness of the spacer ring 43 is equal to or greater than the thickness of the outer frame. In other words, the top surface of the spacer ring 43 can be aligned with or higher than the top surface of the outer frame. The spacer ring 43 can be made of the same material as the electrical distribution substrate 40 (or as the laminate in conductive stack 33), and can be attached as a laminate layer on top of the electrical distribution layer 40. The spacer ring 43 can take a rectangular shape, as shown in FIG. 1B, but can take other shapes to comply with design requirements.

In the illustrated embodiment, the spacer ring 43 is provided with a Through Silicon Via (TSV) 38 that electrically connects the wire bond pads 34 to the underlying electrical distribution substrate 40. This allows for electrical communication from the sensor 12, through the wire bond interconnects 36, to the wire bond pad 34, through the conductive stack 33, through the TSV 38 within the spacer ring 43 and to the electrical distribution substrate 40, and then through the solder 42 to a device, such as a printed circuit board of a camera product for example.

The TSVs 38 allow for an electrical connection from the sensor 12 to the electrical distribution substrate 40 by way of the spacer ring 43, which can be a vertical extension of the electrical distribution substrate 40 itself. The MEMS actuator 18 and the sensor 12 can thus be encapsulated into the package 14 using the MEMS actuator 18 (specifically its stator 22) as a base for the RDL. This enables a compact packaging of the MEMS device 10 with a reduced vertical footprint.

The package 14, electrical distribution substrate 40, and cover 16 (if provided) are sized to enable significant vertical movement of the rotor 20 and sensor 12. For example, an air gap 13 can exist above the sensor 12 and below the cover 16, wherein the size of this gap 13 exceeds the combined thickness of the sensor 12 and rotor 20. In an embodiment, the size of the gap 13 is approximately double the combined thickness of the sensor 12 and rotor 20. In embodiments, the thickness of the gap 13 is more than double the combined thickness of the sensor 12 and the rotor 20. The thickness of the gap 13 can also exceed the combined thickness of the sensor 12, the thermal spreader 54 (described below), the MEMS actuator 18. The interior of the package 14 can be filled with gas (e.g., inert gas, air, $N_2$, etc.). In another embodiment, the interior of the package is filled with liquid that matches the refractive index of the cover 16 to increase thermal conductivity and shock absorption.

As shown in FIG. 1A is one or more surface-mount technology (SMT) components 50. The SMT component 50 can be an electrical component such as a resistor, capacitor, ceramic chip carrier, transistor, and the like. The SMT component 50 can be mounted directly to an upper surface of the conductive stack 33 and encapsulated within the package.

Also shown in FIG. 1A, the conductive stack 33 can also support one or more embedded components 52, such as both passive and integrated circuit die. Connections can be made to these embedded components 52 by way of via structures (e.g., copper or conductive material as described above) in the conductive stack 33 to metal pads (not shown) on the structure of the embedded components 52.

FIG. 1A also illustrates a thermal spreader 54. The thermal spreader 54 can be a sheet or layer of flexible material such as graphite or a graphite/metal composite, or other material configured to spread or dissipate heat generated by the various components. In an embodiment, the thermal spreader 54 is a pyrolytic graphite sheet (PGS). In other embodiments, the thermal spreader 54 is made of copper, aluminum, or other material. If provided in the MEMS device 10, the thermal spreader 54 can be positioned beneath the conductive stack 33 and above the spacer ring 43, and can be attached directly to and between the sensor 12 and rotor 20. Being flexible, the thermal spreader 54 does not impede the vertical movement of the rotor 20 relative to the stator 22. In non-illustrated embodiments, the thermal spreader layer 54 is not provided. In such embodiments, the TSVs 38 merely end at an upper surface of the spacer ring 43, and the sensor 12 is connected directly to the rotor 20. In either embodiment in which the thermal spreader layer 54 is present or not present, it can be said that the sensor 12 is supported by or above the actuator rotor 20, such that the sensor 12 and actuator rotor 20 move in unison as indicated by arrow 24.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A MEMS device comprising:
   an electrical distribution substrate;
   a spacer ring extending upward from the electrical distribution substrate;
   an actuator stator positioned above the electrical distribution substrate and within the spacer ring, the actuator stator having a floor and an outer frame extending upward from the floor;
   an actuator rotor suspended above the floor of the actuator stator and within the outer frame;
   a sensor supported by and above the actuator rotor;
   a conductive stack positioned above the spacer ring;
   a wire bond pad disposed on the conductive stack; and
   a wire bond interconnect electrically coupling the sensor to the wire bond pad;
   wherein the spacer ring includes a via extending therethrough which electrically connects the conductive stack to the electrical distribution substrate, enabling an electrical connection between the sensor and the electrical distribution substrate by way of the conductive stack and the via.

2. The MEMS device of claim 1, wherein the spacer ring is an integral extension of the electrical distribution substrate, and the via extends only to an upper surface of the electrical distribution substrate.

3. The MEMS device of claim 1, wherein the actuator stator is mounted directly to the electrical distribution substrate.

4. The MEMS device of claim 1, wherein the electrical distribution substrate is a Redistribution Layer (RDL).

5. The MEMS device of claim 1, further comprising a thermal spreader mounted to and between the sensor and the actuator rotor, wherein the thermal spreader is mounted to the spacer ring, and wherein the via extends through the thermal spreader.

6. The MEMS device of claim 1, further comprising a package at least partially encapsulating the actuator rotor and the sensor, wherein the package is sized and configured to enable vertical movement of the actuator rotor and the sensor within the package.

7. The MEMS device of claim 1, wherein the actuator rotor and the actuator stator are configured such that when a voltage is applied across the actuator rotor and the actuator stator, an electrostatic force develops to move the actuator rotor from a first vertical position to a second vertical position relative to the actuator stator.

8. The MEMS device of claim 1, wherein a thickness of the spacer ring is equal to or greater than a thickness of the actuator stator.

9. A MEMS device comprising:
   an electrical distribution substrate;
   an actuator stator supported to and above the electrical distribution substrate, the actuator stator having a floor and an outer frame extending upward from the floor;
   an actuator rotor suspended above the floor of the actuator stator and within the outer frame;
   a lower ring extending upward from the electrical distribution substrate, wherein the lower ring is located radially outward from the outer frame of the actuator stator;
   an upper ring vertically aligned with the lower ring;
   a sensor connected to the rotor such that the sensor and the rotor can move vertically relative to the stator;
   a wire bond interconnect electrically connecting the sensor to the upper ring; and
   a via extending through the lower ring and to the electrical distribution substrate;
   wherein an electrical connection is provided between the sensor and the electrical distribution substrate due to an electrical pathway defined by the wire bond interconnect, the upper ring, and the via.

10. The MEMS device of claim 9, wherein the lower ring is an integral extension of the electrical distribution substrate, and the via extends only to an upper surface of the electrical distribution substrate.

11. The MEMS device of claim 9, wherein the actuator stator is mounted directly to the electrical distribution substrate.

12. The MEMS device of claim 9, further comprising a SMT component mounted directly to the upper ring.

13. The MEMS device of claim 9, wherein the electrical distribution substrate is a Redistribution Layer (RDL).

14. The MEMS device of claim 9, further comprising a thermal spreader mounted to and between the sensor and the actuator rotor, wherein the thermal spreader is mounted to the lower ring, and wherein the via extends through the thermal spreader.

15. The MEMS device of claim 9, further comprising a package at least partially encapsulating the actuator rotor and the sensor, wherein the package is sized and configured to enable vertical movement of the actuator rotor and the sensor within the package relative to the actuator stator.

16. The MEMS device of claim 9, wherein the actuator rotor and the actuator stator are configured such that when a voltage is applied across the actuator rotor and the actuator stator, an electrostatic force develops to move the actuator rotor from a first vertical position to a second vertical position relative to the actuator stator.

17. The MEMS device of claim 9, wherein the lower ring has a height that exceeds that of the outer frame.

18. The MEMS device of claim 9, wherein during static moments, an upper surface of the actuator rotor is aligned with an upper surface of the outer frame.

19. The MEMS device of claim 9, further comprising a glass cover vertically spaced from the sensor, wherein a gap exists between the glass cover and the sensor, wherein a thickness of the gap between the glass cover and the sensor exceeds a combined thickness of the sensor and the actuator rotor.

20. A MEMS device comprising:
   a Redistribution Layer (RDL) substrate;
   a spacer ring extending vertically from the RDL substrate and having a plurality of vias extending therethrough and in electrical communication with the RDL substrate;
   a stack including copper and laminate and forming a ring, the stack electrically coupled to the RDL substrate by way of the vias;
   a MEMS actuator having a stator mounted to the RDL substrate and within the spacer ring, the MEMS actuator further having a rotor suspended above the stator and configured to translate vertically relative to the stator;
   a sensor supported above the rotor and configured to translate vertically along with the rotor; and
   a wire electrically connecting the sensor to the stack.

* * * * *